May 28, 1963  C. R. SATRUM  3,091,501
FIFTH WHEEL DEVICE
Filed April 3, 1961
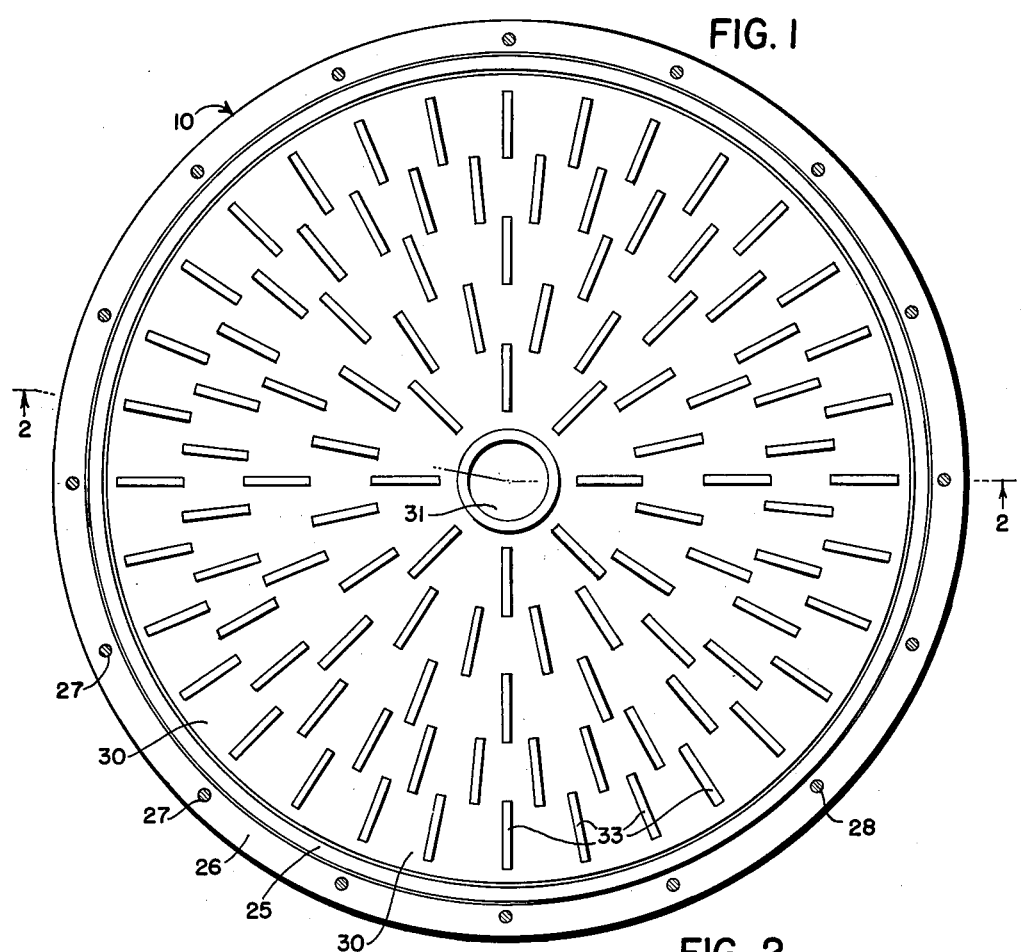
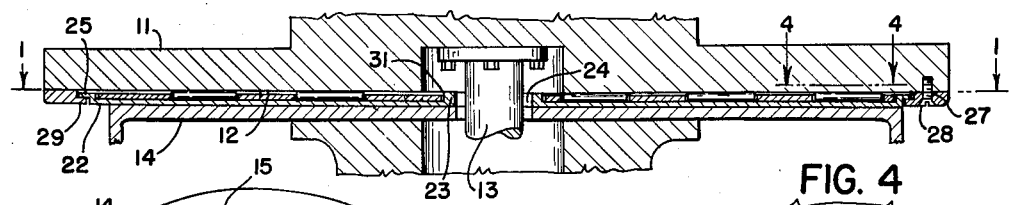
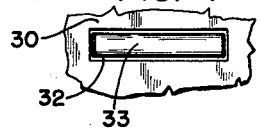
INVENTOR.
CLARENCE R. SATRUM
BY
*Williamson Palmatier*
ATTORNEYS

United States Patent Office 3,091,501
Patented May 28, 1963

3,091,501
FIFTH WHEEL DEVICE
Clarence R. Satrum, Minneapolis, Minn., assignor to Ho-Boy Corporation, Minneapolis, Minn., a corporation of Minnesota
Filed Apr. 3, 1961, Ser. No. 100,233
6 Claims. (Cl. 308—222)

This invention relates to fifth wheel devices and more particularly to a bearing and coupling structure for use with fifth wheel devices to improve the operation thereof.

In the conventional fifth wheel device, especially those used to couple tow-type trailers to tractors, the fifth wheel is comprised generally of upper and lower companion coupling plates each carried respectively by the trailer and tractor. These plates are interconnected by a king pin so that there is relative rotation therebetween whereby the fifth wheel actually defines an articulate hitch connection.

It is absolutely essential that there be ready rotation of swiveling between these plates to permit the truck and its tow trailer to negotiate curves and the like. In order to prevent these plates from sticking, the confronting faces of the plates are coated with lubricating grease, but it was found that when the parts were interconnected the grease was scraped therefrom.

In some prior art devices, slots had been made in the opposing faces of the plates so that these slots actually constitute small reservoirs for the grease but it has been found that this arrangement is not entirely satisfactory to give the smooth and even rotation and to eliminate the danger of freezing or sticking of these plates.

In other prior art devices, the use of ball bearings between the plates was attempted but not only was the cost of the structure extremely high, but there was uneven wear on the companion members. These areas of wear were concentrated at the ball engaging surfaces and many of these ball bearing structures for use with fifth wheels because of their cumbersome construction also tended to bind. My invention is directed to overcoming these problems.

It is, therefore, a general object of my invention to provide a novel bearing and coupling structure, of simple and inexpensive design, for use with conventional fifth wheel devices to greatly improve the operation thereof.

Another object of this invention is to provide a conventional fifth wheel device with a novel roller bearing structure to facilitate relative rotation of the fifth wheel coupling plates, the roller bearing structure being readily connectible to the fifth wheel device without necessitating alteration of the structure of the latter.

Another object of this invention is the provision of a novel and improved roller bearing structure for use with conventional fifth wheel devices and including a plurality of elongate rollers interposed between the fifth wheel plates and being freely revolvable and radially arranged substantially throughout the entire area defined by the confronting faces of the fifth wheel plates to assure even and ready relative rotation of the plates.

These and other objects and advantages of my invention will more fully appear from the following description made in connection with the accompanying drawing wherein like character references refer to the same or similar parts throughout the several views, and in which:

FIG. 1 is a top plan view of my invention;

FIG. 2 is a cross sectional view of my invention taken along approximately line 2—2 of FIG. 1 and looking in the direction of the arrows;

FIG. 3 is a rear perspective view on a reduced scale of the lower coupling plate of a conventional fifth wheel and normally carried by a tractor; and FIG. 4 is a top plan view on an enlarged scale of one of the rollers.

Referring now to the drawings and more particularly to FIG. 2, it will be seen that my novel coupling and bearing structure designated in its entirety by the reference numeral 10 is shown mounted to the upper coupling plate 11 of a conventional fifth wheel device. These conventional fifth wheel devices actually constitute an articulate hitch between a prime mover and a towed vehicle. The greatest use of the fifth wheels probably is in the trucking industry wherein the tractor is provided with one part of the fifth wheel hitch while the tow trailer is provided with the other portion of the hitch. Although my fifth wheel structure may be used for other interconnected vehicles, it is primarily for use with a tractor and truck-type fifth wheel device.

The upper coupling plate 11 is fixedly connected to the sub-frame or lower under surface of a trailer. This coupling plate 11 has a downwardly facing bearing surface or face 12 and is also provided with a depending king pin 13. The other portion of the conventional fifth wheel device includes a lower coupling plate 14 carried by the tractor or prime mover and which has an upper bearing surface 15. This lower coupling plate is also provided with a pair of laterally spaced apart rearwardly projecting inclined ramps 16 of conventional structure and which serve to facilitate connection and disconnection of the upper and lower plates. The lower plate 14 is also provided with a rearwardly opening throat 17 terminating forwardly in a downwardly opening recess 18, the latter receiving the king pin 13 therethrough.

The lower coupling plate 14 is pivotally mounted on a pair of spaced apart attachment brackets 19 by means of pivot pins 20 for each bracket. These brackets 19 are in turn bolted to the tractor by means of conventional bolts 21 also in a well known manner. The lower coupling plate 14 is also provided with suitable locking means for releasably locking the king pin 13 when the latter is positioned within the recess 18 so that the coupling plates are coupled together for rotation about a vertical axis defined by the king pin. The plates defining this conventional fifth wheel device are connected by backing the truck so that the lower coupling plate 14 will slide into engagement with the upper coupling plate 11 and with the king pin 13 moving into lock engagement with the locking means carried by the lower plate.

In order to permit free relative rotation between these coupling plates 11 and 14, the heavy lubricating grease is applied to their respective bearing surfaces, but it has been found that when these plates are shifted for interconnection thereof, this lubricating grease is scraped off. Some conventional fifth wheel devices are provided with a plurality of elongate recesses located on the lower coupling plate 14 so that grease will be retained in these recesses even during the coupling operation of the plates. This grease in the slots of lower coupling plate in this type of fifth wheel is intended to flow upon the entire bearing surfaces of the coupling plates to provide suitable lubrication thereof. This particular arrangement, however, has not been found satisfactory and the plates are not suitably lubricated to assure ready and free swiveling of the parts thereof.

My novel coupling and bearing structure 10 precludes any tendency of the upper and lower coupling plates of conventional fifth wheel devices from sticking and assures free rotation of these parts during operation of the fifth wheel device.

Referring now to FIG. 1, it will be seen that my novel coupling and bearing structure 10 includes a substantially flat roller bearing support plate 22, constructed of suitable metal such as steel and the like and being of generally circular configuration. Plate 22 is provided with an axially extending boss 23 defining a centrally located opening 24 therethrough. The outer marginal surface of the support plate 22 is provided with an outwardly extending annular flange 25 rigidly connected therewith. It will be noted, as best seen in FIG. 2, that the annular flange 25 is offset axially so that the inner annular surface thereof cooperates with the bearing support plate 22 to define a shallow cylindrical container.

Means are provided for detachably mounting the roller bearing support plate 22 to the upper coupling plate 11 and this means includes an annular mounting ring 26 also constructed of suitable metallic material such as steel and having a plurality of circumferentially arranged apertures 27 formed therein. These apertures 27 are adapted to receive bolts 28 therethrough, the latter being threadedly engageable with corresponding apertures in the upper coupling plate 11. The annular mounting ring 26 is also provided with an inwardly extending annular flange 29, the latter being integrally formed with the mounting ring 26 but being of a thickness substantially less than the thickness of the mounting ring. It will be seen that the annular flange 25 of the roller support plate 22 will be engaged by the inwardly extending annular flange 29 of the mounting ring 26 so that when the mounting ring is detachably secured to the upper coupling plate 11 the lower bearing support plate may be positioned with the king pin extending through the centrally located opening 24 thereof.

A substantially flat roller positioning element or disc 30 is supported by the roller bearing support plate 22 and this roller positioning disc 30 is provided with a centrally located opening 31 of a size to extend around the axially extending boss 23. Referring to FIG. 2, it will be noted that the roller positioning disc 30 is positioned within the area defined by the inner circumferential edge of the out-turned annular flange 25. Thus, in effect, the roller positioning disc 30 is positioned within the shallow cylindrical container defined by the bearing support plate 24 and its associated annular flange 25.

Referring again to FIG. 1, it will be seen that the roller positioning disc 30 is provided with a plurality of elongate slots 32. These slots 32 are actually arranged in concentric rows. It will also be noted that with this arrangement, each slot extends radially outwardly with respect to the axis of rotation of the coupling plate 11 and 14 of the fifth wheel device when the coupling and bearing structure is so secured to the fifth wheel device. It will also be noted that the elongate slots 32 are of identical shape and these slots are alternately staggered with respect to each other throughout the entire area of the roller positioning disc 30. The roller positioning disc 30 is preferably of a size approximating the area defined by the confronting bearing faces 12 and 15 of the respective plates 11 and 14. Since the centrally located opening 31 in the lower positioning disc 30 is slightly larger than the axially extending boss 23 of the bearing support plate 22, the lower positioning disc will be mounted for free rotation about the king pin 13 when the coupling and bearing structure is secured to the upper coupling plate 11.

Each of the elongate slots 32 has an elongate roller 33 revolvably disposed therein and in this connection it will be noted that the rollers will be radially arranged and alternately staggered over the entire area defined by confronting faces of the upper and lower coupling plates of the fifth wheel device. Since the rollers 33 are merely positioned within the elongate slots 32, these rollers will be freely revolvable about their respective longitudinal axes and actually define a uniform rolling bearing surface for the upper coupling plate 11. In this connection, it will be noted that the rollers 33, as best seen in FIG. 2, have a diameter slightly greater than the thickness of the roller positioning disc 30 so that when the roller positioning disc 30 is positioned upon the roller bearing support plate 22 the rollers 30 will be in bearing engagement with the roller bearing support plate 22 and the upper coupling plate 11.

When my novel coupling and bearing structure 10 is incorporated in the conventional fifth wheel structure, there will be free and ready rotation or swiveling between the upper and lower plates of the fifth wheel device. It will also be noted that in the conventional fifth wheel device the pull of the trailer is transmitted through the king pin 13. It will also be noted that the king pin continues to absorb the full pull of the trailer even when my novel coupling and bearing structure is incorporated within a fifth wheel device. Thus, there is no tendency of binding in my roller bearing structure while this bearing structure permits free rotation of the companion plates of the fifth wheel. It will also be noted that the annular mounting ring 26 of my novel roller bearing structure does not bear any of the load stress but merely serves as an attachment means for the roller bearing support plate 22. This permits the coupling and bearing structure 10 to be maintained or connected to the trailer when the upper plate 11 is disconnected from the lower coupling plate 14. It will also be noted that the concentric relation and staggered arrangement of the roller bearings throughout the area defined by the confronting faces of the coupling plate, the weight stress of the trailer will be transmitted uniformly throughout the bearing surfaces of the fifth wheel by means of the rollers. It will also be noted that the roller positioning disc 30 while permitting ready and accurate positioning of the various rollers associated therewith does not have the rollers attached thereto so that this arrangement reduces any tendency of binding or uneven wear of the rollers. Further, the roller positioning disc 30 is freely revolvable relative to the roller bearing support plate 22, so that there is no tendency of these parts to become disposed in binding relationship.

It will, therefore, be noted from the preceding paragraphs that I have provided a novel coupling and bearing structure for use with conventional fifth wheel devices to facilitate operation of the fifth wheel devices. It will be seen from the foregoing description that the use of my novel roller bearing structure allows the companion coupling plates of fifth wheel devices to rotate and operate in a more efficient manner than was heretofore possible thus precluding the fifth wheel from sticking. It will be noted that trucks and trailers coupled with the conventional fifth wheel device incorporating my novel invention will track smoothly and evenly when negotiating curves, thus eliminating a perilous and hazardous condition sometimes occurring through malfunctioning of fifth wheel devices.

It will also be noted that my novel and unique roller bearing coupling permits even wearing of the various parts thereof and thereby eliminates the necessity of adjustment of any of the parts.

It will, therefore, be seen that I have provided a novel and improved coupling and bearing structure for use with conventional fifth wheel devices which is not only of simple and inexpensive construction but functions in a more efficient manner than any heretofore known comparable devices.

It will, of course, be understood that various changes may be made in the form, details, arrangements, and proportions of the various parts without departing from the scope of my invention.

What is claimed is:

1. In a fifth wheel device of the type comprising upper and lower coupling plates disposed in superimposed relation, the upper plate having a king pin depending therefrom and extending into a recess in the lower coupling plate to detachably and rotatably interconnect the plates for relative rotation therebetween about a substantially vertical axis defined by said king pin, a bearing and coupling structure including a roller support plate member having a centrally located opening therethrough and having an upturned peripheral flange to thereby define a shallow receptacle, said support plate being interposed between said coupling plates so that said king pin extends through said opening, a substantially flat roller positioning element mounted on said support member and having a centrally located aperture therein for receiving said king pin therethrough whereby said roller positioning element is supported for free rotation around the king pin, said roller positioning plate member having a plurality of elongate slots formed therein and arranged in radially extending relation with respect to the axis of rotation of the coupling plates, said slots being alternately arranged with respect to each other substantially throughout the area of the roller positioning element, the latter being of a size approximating the size of confronting faces of said coupling plates, a plurality of elongate rollers each being loosely positioned in one of said slots in complete disconnected relation from said positioning plate member and each roller being freely revolvable about its longitudinal axis, each of said rollers being slightly smaller than its associated slot to thereby permit said roller to be readily removed from its loosely disposed position within its associated slot, and means for mounting said roller support member on one of said coupling plates whereby said rollers define a uniform rolling bearing for said one coupling plate to thereby facilitate relative rotation of said plates.

2. The structure as defined in claim 1 wherein said mounting means comprises an annular mounting ring detachably connected to the upper coupling plate.

3. The structure as defined in claim 1 wherein each of said rollers has a diameter substantially greater than the thickness of said roller positioning element.

4. In a fifth wheel device of the type comprising upper and lower coupling plates disposed in superimposed relation, the upper coupling plate having a king pin depending therefrom and extending into a recess in the lower coupling plate to detachably and rotatably interconnect the plates for relative rotation therebetween about a substantially vertical axis defined by the king pin, a bearing and coupling structure comprising a generally circular roller support plate having a centrally located opening therethrough and having an upturned peripheral flange to define a shallow receptacle, said support plate being interposed between said coupling plates so that said king pin extends through said opening, a substantially circular roller positioning disc mounted on said roller support plate and having a centrally located aperture therein for receiving said king pin therethrough so that said roller positioning disc is freely revolvable about the king pin, the roller positioning disc being of a size approximating the size of confronting faces of said coupling plate and having a plurality of elongate slots formed therein arranged in radially extending relation with respect to the axis of rotation of said coupling plates, the slots being alternately arranged with respect to each other substantially throughout the area of the roller positioning disc, a plurality of similar elongate roller elements each being loosely positioned in one of said slots in disconnected relation from said disc and each roller being freely revolvable about its longitudinal axis, each of said rollers being slightly smaller than its associated slot to thereby permit said rollers to be readily removed from their seated relation within said slots, and an annular mounting member for mounting said roller support plate on one of said coupling plates whereby said rollers define a uniform roller bearing for said one coupling plate to thereby facilitate relative rotation between said plates.

5. The structure defined in claim 4 wherein each of said elongate rollers has a diameter substantially greater than the thickness of said roller positioning disc.

6. In a fifth wheel device comprising an upper plate and a lower plate disposed in superimposed relation,
   the upper plate having a king pin depending therefrom and extending into a recess in the lower plate to detachably and rotatably interconnect the plates for relative rotation therebetween about a vertical axis defined by said king pin,
   a bearing and coupling structure comprising a generally cylindrical flat support plate member having a centrally located opening therein and having an upturned peripheral flange to thereby define a shallow receptacle,
   means detachably mounting said support plate to said upper plate,
   a generally cylindrical flat positioning plate member mounted within said support plate member and having a centrally located aperture therein for receiving said king pin therethrough so that said positioning plate member is freely revolvable about a king pin,
   said positioning plate member having a plurality of identical openings therein throughout the general area of the positioning plate member,
   and a plurality of identical revolvable elements each being loosely disposed in one of said openings in disconnected relation from said positioning plate member and each revolvable element being freely revolvable relative to said positioning plate member,
   each of said revolvable elements being slightly smaller than its associated aperture to permit ready removal from its seated relation in the slots of said positioning plate member.

References Cited in the file of this patent
UNITED STATES PATENTS

| | | |
|---|---|---|
| 2,007,041 | Dorsey | July 2, 1935 |
| 2,055,524 | Ellis | Sept. 29, 1936 |
| 2,117,633 | Smith | May 17, 1938 |
| 2,193,744 | Shriver | Mar. 12, 1940 |
| 2,655,117 | Travilla | Oct. 13, 1953 |
| 2,662,799 | Schaefer | Dec. 15, 1953 |